US011274762B2

United States Patent
Fisch et al.

(10) Patent No.: US 11,274,762 B2
(45) Date of Patent: Mar. 15, 2022

(54) FLOAT AND HINGE FOR A VALVE

(71) Applicant: Walbro LLC, Tucson, AZ (US)

(72) Inventors: Elton J. Fisch, Caro, MI (US); Jeffrey D. Hanby, Cass City, MI (US)

(73) Assignee: Walbro LLC, Cass City, MI (US)

( * ) Notice: Subject to any disclaimer, the term of this patent is extended or adjusted under 35 U.S.C. 154(b) by 62 days.

(21) Appl. No.: 16/228,885

(22) Filed: Dec. 21, 2018

(65) Prior Publication Data

US 2019/0195377 A1     Jun. 27, 2019

Related U.S. Application Data

(60) Provisional application No. 62/609,952, filed on Dec. 22, 2017.

(51) Int. Cl.
*F16K 24/04* (2006.01)
*F16K 31/18* (2006.01)
*F02M 37/20* (2006.01)

(52) U.S. Cl.
CPC ........... *F16K 24/048* (2013.01); *F02M 37/20* (2013.01); *F16K 31/18* (2013.01); *Y10S 261/52* (2013.01);
(Continued)

(58) Field of Classification Search
CPC .. F16K 24/048; F16K 31/18; F16K 24/00–06; F16K 24/042; F02M 37/20; F02M 1/00; F02M 2700/4333; F02M 37/04; F02M 37/24; F02M 37/46; Y10T 137/053; Y10T 137/0874; Y10T 137/0777; Y10T 137/6007; Y10T 137/7475; Y10T 137/3099; Y10T 137/7439; F16T 1/24; F16T 1/28; F16T 1/305; F16T 1/32; G01F 23/30; G01F 23/34; Y10S 261/52; E03D 1/32; E04H 4/1654; E05D 3/122; E05D 7/1011; B65D 47/0828; E02B 3/064; B63B 35/34; B65G 15/30; G06F 1/1616;
(Continued)

(56) References Cited

U.S. PATENT DOCUMENTS 1,598,948 A * 9/1926 Watt ......................... F02M 1/00
                                                              137/445
1,710,848 A * 4/1929 Turek .................... F24D 19/087
                                                              137/202
(Continued)

FOREIGN PATENT DOCUMENTS

JP          S59138421 A      8/1984

*Primary Examiner* — Craig J Price
(74) *Attorney, Agent, or Firm* — Reising Ethington P.C.; Matthew J. Schmidt

(57) ABSTRACT

In at least some implementations, an assembly includes a float having a void with an inlet leading into the void in a first direction, and at least one retention surface that is not parallel to the first direction and a hinge received at least partially within the void. The hinge has at least one retention feature that cooperates with the at least one retention feature of the float to inhibit removal of the hinge from the float in a second direction opposite to the first direction, and the hinge is formed from a polymeric material. In at least some implementations, the hinge has a melting point similar to or lower than the melting point of the material of the float, and the hinge is formed separately from and is pressed into the void in the float.

19 Claims, 10 Drawing Sheets

(52) U.S. Cl.
CPC .... *Y10T 137/3099* (2015.04); *Y10T 137/7439* (2015.04)

(58) Field of Classification Search
CPC ... B26B 21/521; B29B 7/7663; A61B 5/6826; F03B 13/20
USPC ......... 137/39, 43, 202, 587, 588; 123/41.31, 123/497, 506, 509, 514, 518, 516, 519, 123/520, 541, 572, 198 D; 116/228, 229; 210/129, 167, 188, 258, 349; 73/322.5, 73/305, 306, 448, 317
See application file for complete search history.

(56) References Cited

U.S. PATENT DOCUMENTS

| | | | | |
|---|---|---|---|---|
| 2,202,993 A * | 6/1940 | Mollberg | ................ | F02M 1/00 137/434 |
| 2,333,030 A * | 10/1943 | Meyer | ................ | F02M 1/02 261/53 |
| 2,493,474 A * | 1/1950 | Breese | ................ | F16K 31/20 431/64 |
| 2,670,007 A * | 2/1954 | Adams | ................ | F16K 33/00 73/322.5 |
| 2,782,797 A * | 2/1957 | Hintermayr | .............. | F02M 1/00 137/409 |
| 2,847,025 A * | 8/1958 | Reitman | ................ | F16K 31/26 137/426 |
| 3,202,173 A * | 8/1965 | Szwargulski | ............ | F02M 1/00 137/426 |
| 3,239,928 A * | 3/1966 | Baker | ................ | A63B 37/0003 29/433 |
| 3,263,975 A * | 8/1966 | Wu | ................ | F02M 1/00 261/70 |
| 3,298,231 A * | 1/1967 | Zukley | ................ | E03D 1/32 73/322.5 |
| 3,320,922 A | 5/1967 | Taylor et al. | | |
| 3,324,923 A * | 6/1967 | Thompson | ............ | F17C 13/008 137/154 |
| 3,334,649 A * | 8/1967 | Thompson | ............... | F02M 1/00 137/329.04 |
| 3,463,843 A | 8/1969 | Taylor et al. | | |
| 3,477,238 A * | 11/1969 | Race | ................ | F02M 1/10 62/3.61 |
| 3,584,642 A * | 6/1971 | Wilson | ................ | A01K 7/04 137/270 |
| 3,853,418 A * | 12/1974 | Druin | ................ | E04H 12/02 404/1 |
| 3,875,267 A * | 4/1975 | Seki | ................ | F02M 5/16 261/70 |
| 3,898,760 A * | 8/1975 | Klein | ................ | A01K 91/04 43/44.83 |
| 3,905,149 A * | 9/1975 | McCloud | ................ | A01K 83/06 43/44.2 |
| 3,908,107 A | 9/1975 | Danne et al. | | |
| 4,098,236 A * | 7/1978 | Okawa | ................ | F02M 37/0052 123/41.02 |
| 4,195,608 A * | 4/1980 | Sanada | ................ | F02M 5/10 123/514 |
| 4,448,213 A * | 5/1984 | Seeley | ................ | F16K 31/18 137/451 |
| 4,702,215 A * | 10/1987 | Lebold | ................ | F02M 37/0023 123/514 |
| 4,850,132 A * | 7/1989 | Motyka | ................ | A01K 83/06 43/44.2 |
| 4,862,745 A * | 9/1989 | Rericha | ................ | G01F 23/76 73/322.5 |
| 5,103,793 A * | 4/1992 | Riese | ................ | F02M 37/20 123/516 |
| 5,119,790 A * | 6/1992 | Olson | ................ | F02M 37/0023 123/510 |
| 5,309,885 A * | 5/1994 | Rawlings | ................ | F01P 3/12 123/184.21 |
| 5,333,499 A * | 8/1994 | Gaston | ................ | G01F 23/32 73/317 |
| 5,368,001 A * | 11/1994 | Roche | ................ | B01D 35/027 123/510 |
| 5,389,245 A * | 2/1995 | Jaeger | ................ | F02M 37/20 123/497 |
| 5,426,271 A | 6/1995 | Clark et al. | | |
| 5,579,740 A * | 12/1996 | Cotton | ................ | F02M 25/0854 123/514 |
| 5,647,331 A * | 7/1997 | Swanson | ................ | F02M 37/10 123/509 |
| 5,831,536 A | 11/1998 | Zager | | |
| 5,855,197 A * | 1/1999 | Kato | ................ | F02B 61/045 123/509 |
| 6,012,434 A * | 1/2000 | Hartke | ................ | F02M 31/20 123/516 |
| 6,041,650 A * | 3/2000 | Swindler | ................ | G01F 23/34 116/229 |
| 6,422,207 B1 * | 7/2002 | Kolb | ................ | F02M 31/20 123/461 |
| 6,422,255 B1 * | 7/2002 | Hartke | ................ | B60K 15/035 123/516 |
| 6,431,199 B1 * | 8/2002 | Kolb | ................ | F02M 37/20 123/516 |
| 6,481,456 B1 * | 11/2002 | Falkner | ................ | F16K 24/048 137/202 |
| 6,581,579 B1 * | 6/2003 | Knight | ................ | F02M 31/20 123/516 |
| 6,679,229 B2 * | 1/2004 | Wada | ................ | F02B 61/045 123/509 |
| 6,701,784 B1 * | 3/2004 | Matusek | ................ | F02M 19/01 73/313 |
| 6,718,953 B1 * | 4/2004 | Torgerud | ............ | F02M 37/103 123/516 |
| 6,857,419 B1 * | 2/2005 | Harvey | ................ | B01D 53/002 123/41.31 |
| 7,293,578 B2 * | 11/2007 | Swindler | ................ | F16K 1/306 137/442 |
| 7,364,609 B2 * | 4/2008 | MacDuff | ................ | B01D 19/00 137/176 |
| 7,497,477 B2 * | 3/2009 | Pepe | ................ | F16L 37/0985 285/319 |
| 9,353,879 B2 * | 5/2016 | Jones | ................ | F16K 31/26 |
| 9,650,772 B2 * | 5/2017 | Lee | ................ | E03D 1/144 |
| 10,052,945 B2 * | 8/2018 | Kimura | ................ | B60K 15/01 |
| 10,807,019 B1 * | 10/2020 | Marver | .............. | B01D 19/0063 |
| 2003/0221560 A1 * | 12/2003 | MacDuff | ................ | F16K 24/048 96/165 |
| 2004/0003797 A1 * | 1/2004 | Nomura | ................ | F02M 37/20 123/461 |
| 2009/0088710 A1 * | 4/2009 | Hoffman | ................ | A61M 1/005 604/323 |
| 2015/0000190 A1 * | 1/2015 | Gibbons | ................ | A01G 27/005 47/66.6 |
| 2015/0067954 A1 * | 3/2015 | Chen | ................ | E03D 1/144 4/324 |
| 2015/0067955 A1 * | 3/2015 | Lee | ................ | E03D 1/144 4/324 |
| 2015/0159766 A1 * | 6/2015 | Gammon | ................ | F16K 24/042 137/2 |

* cited by examiner

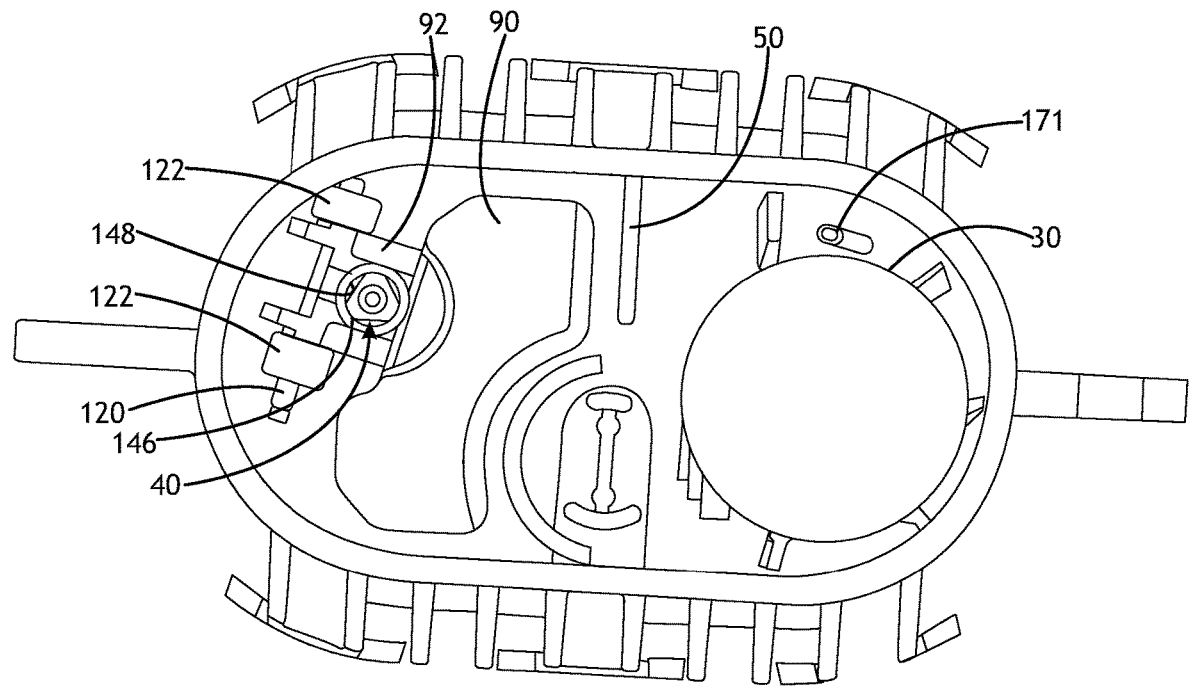
Fig.15
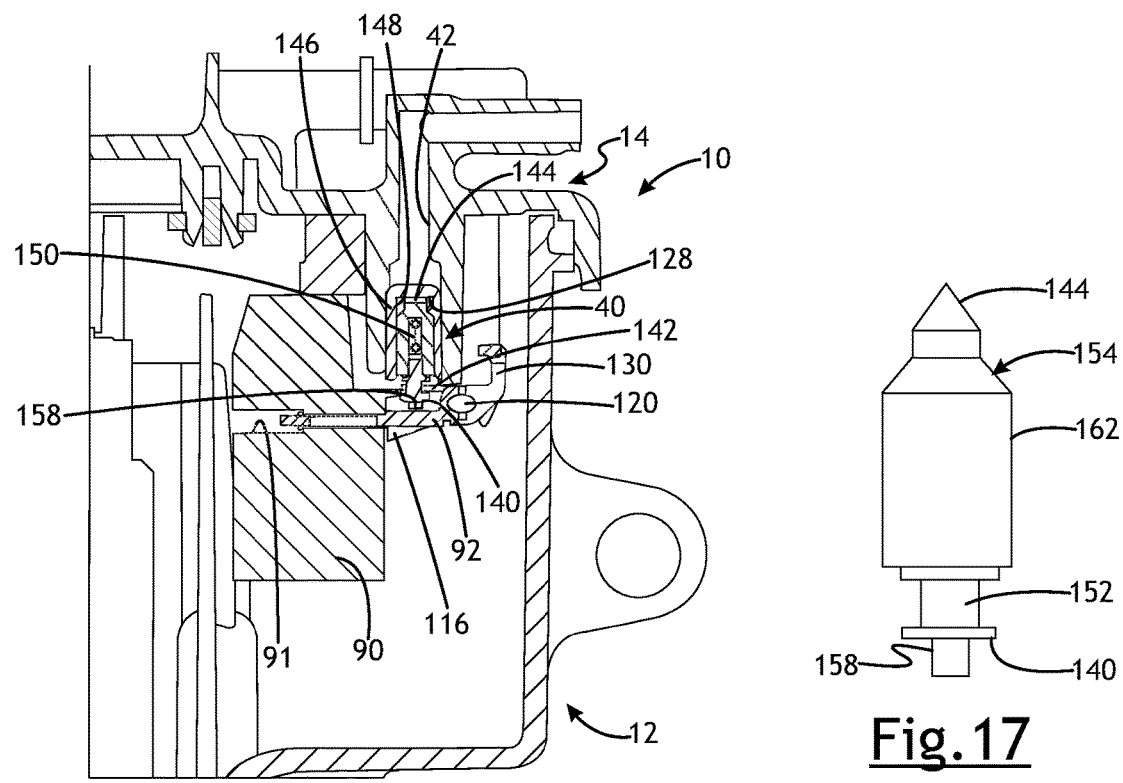
Fig.16
Fig.17

FLOAT AND HINGE FOR A VALVE

REFERENCE TO RELATED APPLICATIONS

This application claims the benefit of U.S. Provisional Application Ser. No. 62/609,952 filed on Dec. 22, 2017, the entire contents of which is incorporated herein by reference in its entirety.

TECHNICAL FIELD

The present disclosure relates generally to a float and a hinge for a valve, and a liquid vapor separator including a float valve with a hinge.

BACKGROUND

Vapor separators are typically used to separate fuel vapor from liquid fuel in a fuel system for an internal combustion engine. A conventional vapor separator is usually connected with inlet and outlet fuel lines between a fuel tank and an engine. The vapor separator typically includes a fuel pump that receives liquid fuel from within the separator and pressurizes it for downstream delivery through fittings and hoses to a fuel rail in fluid communication with the engine. A fuel pressure regulator is typically carried by a downstream end of the fuel rail and returns excess fuel not injected into the engine from the fuel rail to the vapor separator through fittings and hoses. The separator may include a valve to control the incoming fuel flow and a vent valve through which vapor may be vented from the separator.

SUMMARY

In at least some implementations, an assembly includes a float having a void with an inlet leading into the void in a first direction, and at least one retention surface that is not parallel to the first direction and a hinge received at least partially within the void. The hinge has at least one retention feature that cooperates with the at least one retention feature of the float to inhibit removal of the hinge from the float in a second direction opposite to the first direction, and the hinge is formed from a polymeric material. In at least some implementations, the hinge has a melting point similar to or lower than the melting point of the material of the float, and the hinge is formed separately from and is pressed into the void in the float.

The hinge may have a dimension greater than a dimension of a corresponding portion of the void, and the hinge may have a finger that flexes to reduce the dimension of the hinge so that the hinge may be received in the void. The retention feature may be carried by the finger. The float and hinge may include complementary control features that inhibit movement of the hinge in a direction perpendicular to the first direction. The control features may include, for example, complementary ribs or projections that are received in complementary slots or other voids. The hinge may also include a limit surface adapted to engage a stop surface of the float to limit insertion of the hinge into the void. The limit surface may be arranged at a distance from the hinge retention surface that is equal to or greater than the distance between the float retention surface and the stop surface. In at least some implementations, the distances are similar so that the connection between the hinge and float is reasonably tight and significant relative movement between the hinge and flange is inhibited or prevented.

In at least some implementations, the assembly also includes a valve body coupled to the float and hinge without a fastener, adhesive, bond or weld. The valve body may include a flange that is received in a void of the hinge, and the float may be arranged to prevent removal of the flange from the void. That is, the flange may be trapped between the hinge and the float. The hinge may include a pivot coupling feature spaced from the valve body.

In at least some implementations, a liquid vapor separator includes a body defining at least part of an interior volume, a float received within the interior volume, the float being buoyant in liquid that may be received in the interior volume, and the float having a void with an inlet leading into the void in a first direction, and at least one retention surface that is not parallel to the first direction and a hinge received at least partially within the void. The hinge has at least one retention feature that cooperates with the at least one retention feature of the float to inhibit removal of the hinge from the float in a second direction opposite to the first direction, wherein the hinge is formed from a polymeric material. In at least some implementations, the hinge has a melting point similar to or lower than the melting point of the material of the float, and the hinge is formed separately from and is pressed into the void in the float.

In at least some implementations, the hinge has a dimension greater than a dimension of a corresponding portion of the void, and the hinge has a finger that flexes to reduce the dimension of the hinge so that the hinge may be received in the void, and the retention feature is carried by the finger. A valve body may be coupled to the float and hinge without a fastener, adhesive, bond or weld. The valve body may include a flange that is received in a void of the hinge, and the float may be arranged to prevent removal of the flange from the void. That is, the flange may be trapped between the hinge and the float.

In at least some implementations, a pivot is provided and the hinge includes a pivot coupling feature spaced from the valve body and coupled to the pivot to permit pivoted movement of the float within the interior volume. The valve body may be moved as the float moves about the pivot. A spring may be provided to yieldably bias the valve body relative to the hinge and float so that at least a portion of the valve body moves relative to the hinge.

In at least some implementations, the separator includes a cover that, with the body, defines the interior volume. The cover may include a pivot to which the hinge is coupled for pivoted movement of the hinge and float relative to the cover. And a valve may be coupled to the hinge at a location spaced from the pivot, and the cover may include an inlet through which liquid enters the interior volume. The valve is moved relative to the cover, as the float moves relative to the cover, to selectively open and close the inlet.

It is contemplated that the various features set forth in the preceding paragraphs, in the claims and/or in the following description and drawings may be taken independently or in any combination. For example, features disclosed in connection with one embodiment or implementation are applicable to all embodiments or implementations, except where there is incompatibility of features.

BRIEF DESCRIPTION OF THE DRAWINGS

The following detailed description of certain embodiments and best mode will be set forth with reference to the accompanying drawings, in which:

FIG. 15 is a section view of the separator taken through a portion of the cover and showing components within the separator;

FIG. 16 is a sectional view showing the float, hinge and inlet valve within the separator;

FIG. 17 is a side view of the inlet valve; and

DETAILED DESCRIPTION

Figure 1:
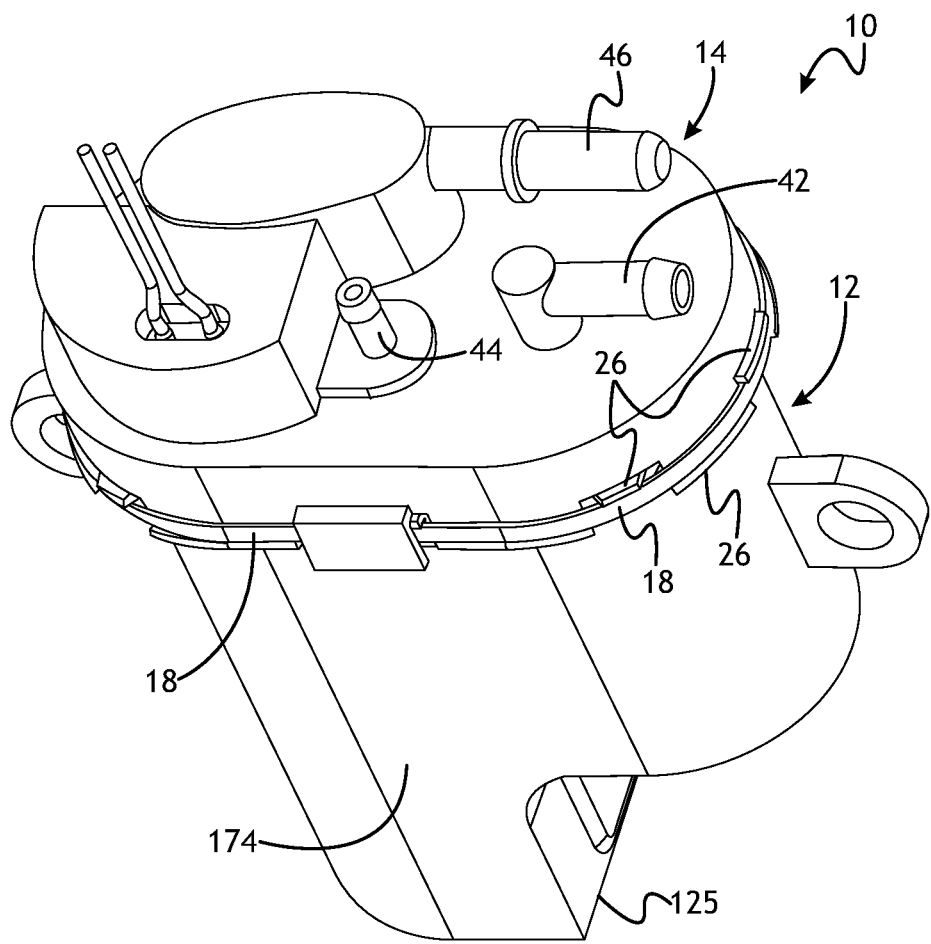
FIG. 1 is a perspective view of a fuel vapor separator.

Referring in more detail to the drawings, FIG. 1 shows a liquid and vapor separator module 10 (sometimes called a "fuel vapor separator" as it may be used in a fuel system) having a body 12 and a cover 14 coupled to the body to define an interior volume 16 in which fluid is received. The body 12 and cover 14 are coupled by a connector 18 that is received between and overlapped by opposed connection features extending from both the body and cover. The connector is shown as a steel strap 18 bent or otherwise formed to conform to the exterior shape of the body 12 and cover 14, and shown in this implementation as generally U-shaped. The strap 18 may engage connection surfaces on either the cover 14 or the body 12 or both the cover 14 and body 12. More than one strap 18 may be used, and two are shown as being used in the illustrated embodiment.

Figure 2:
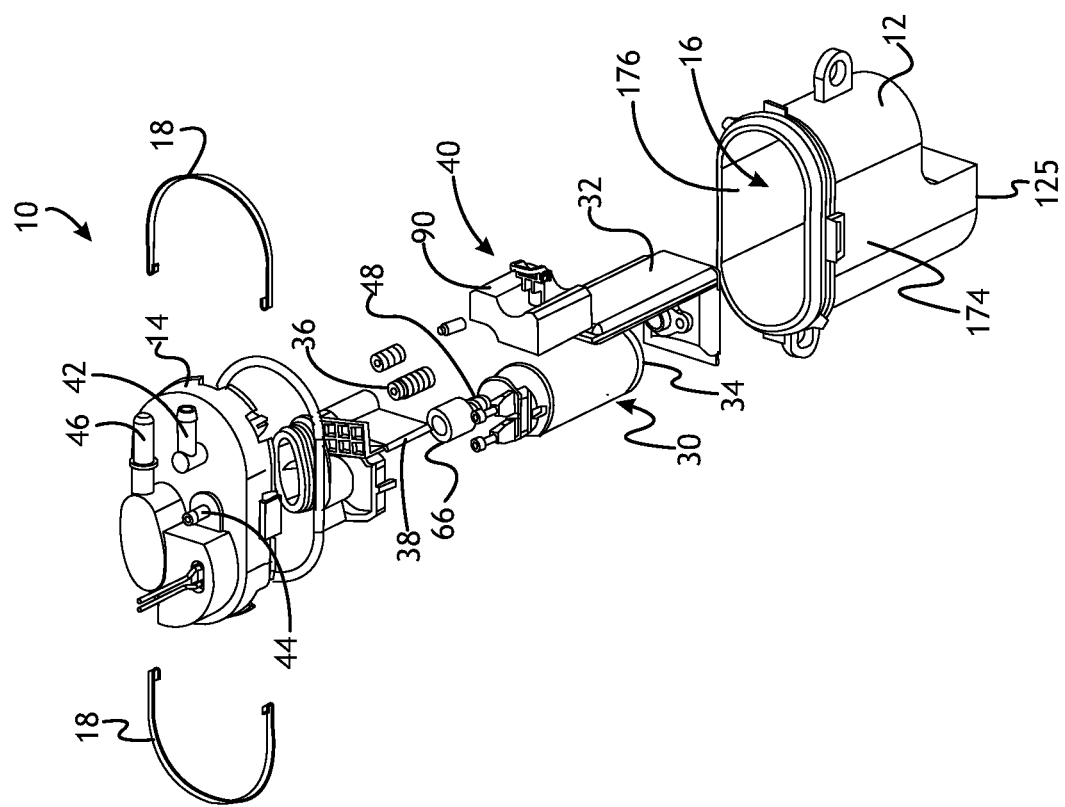
FIG. 2 is an exploded view of the fuel vapor separator.
Figure 5:
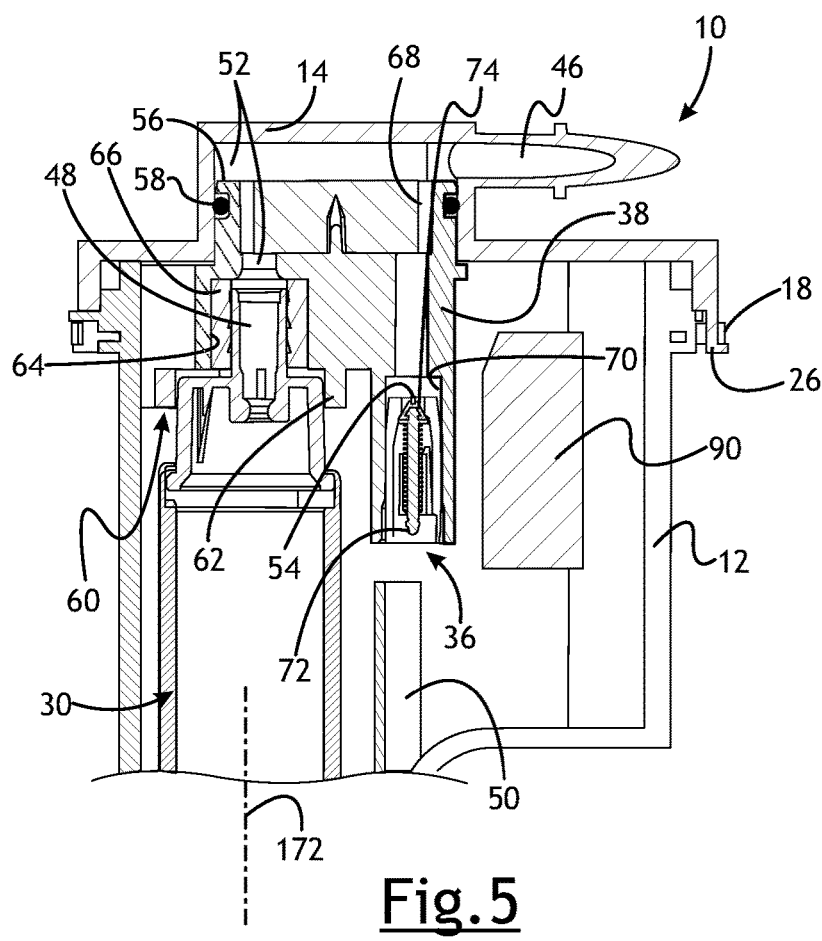
FIG. 5 is a side sectional view showing the fuel pump and fuel pressure regulator.
Figure 7:
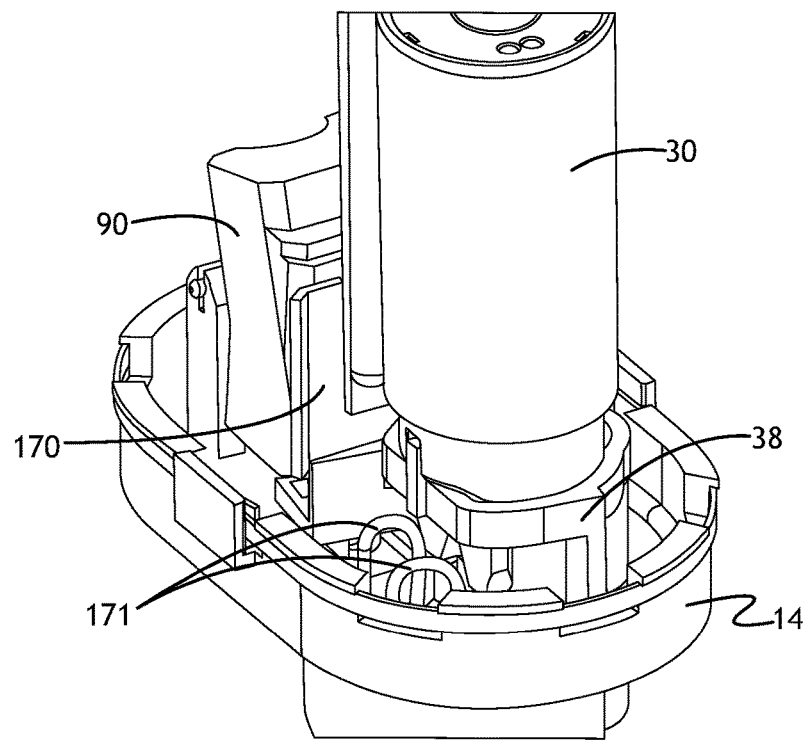
FIG. 7 is a perspective view of the cover, fuel pump and bracket.

As shown in FIG. 2, the separator 10 may also include a fuel pump 30, fuel filter 32 for the inlet 34 of the pump 30, a fuel pressure regulator 36, a bracket 38 (FIG. 7) for the fuel pressure regulator 36 and the fuel pump 30, and a float 90 actuated inlet valve 40. The cover 14 is shown to include an inlet 42 into which fuel is received from a first, generally low pressure fuel pump (sometimes called a "lift pump" that moves fuel from a fuel tank to the module), a vent passage or vapor outlet 44 through which vapor may exit the interior volume 16 and a fuel outlet 46. The fuel pump 30 may be an electrically driven and relatively high pressure fuel pump that discharges fuel under pressure through the fuel outlet 46 for delivery to an engine. The pressure of discharged fuel is controlled at least in part by the fuel pressure regulator 36 which is in communication with the outlet 48 of the fuel pump 30, as best shown in FIG. 5. When the fuel is above a threshold pressure, the pressure regulator valve 36 opens to bypass fuel into the interior volume 16 of the separator. The electrical power to the pump 30 may also or instead be varied (e.g. pulse width modulation) to control, at least in part, the pump output.

In at least some implementations, the bracket 38 is carried by the cover 14, may help locate and be coupled to the fuel pump 30 at or near the fuel pump outlet 48, may carry the fuel pressure regulator 36, and may define all or at least part of a fuel passage(s) 52 between the fuel pump outlet 48 and an inlet 54 of the pressure regulator 36. In the implementation shown, the bracket 38 includes a first end 56 coupled to the cover 14 and including part of the fuel passage 52 arranged to communicate with the fuel outlet 46 of the cover 14. One or more seals 58 may be carried by the cover 14 and/or the bracket 38 to provide a fluid tight seal between them. The bracket 38 may also include a fuel pump retaining portion 60. The fuel pump retaining portion 60 may include one or more retaining features 62 adapted to engage a housing of the fuel pump 30 to at least in part retain the position of the fuel pump relative to the bracket 38 and the module 10 generally.

The fuel pump receiving portion 60 may also include a cavity 64 in the bracket 38 into which a portion of the fuel pump 30 extends, such as an outlet fitting of the fuel pump, so that fuel discharged from the fuel pump enters the cavity 64 and/or a passage communicating with the cavity. Fuel is then routed through the bracket 38 and then to the outlet 46 of the cover 14. As shown in FIGS. 2 and 5, an outlet bushing 66 may be provided between the pump 30 and the bracket 38 to, for example, provide a fluid seal between them, retain the position of the pump and/or to damp vibrations. The fuel passage 52 leads from the cavity 64 to both the outlet 46 of the cover 14, and to a passage or cavity communicated with the fuel pressure regulator inlet 54. In the example shown, bracket 38 has an opening 68 that communicates with the cavity 64 and with the fuel outlet 46, and a seal 58 is provided between the bracket 38 and cover 14 to prevent or inhibit liquid fuel leaking back into the interior volume 16 of the separator 10. Also, in the example shown, the fuel pressure regulator 36 is received at least partially within a second cavity 70 in the bracket 38 and is retained and carried by the bracket. Outlet fuel is routed by the bracket 38 in part to the fuel pressure regulator 36 which may include a valve element 72 biased against a valve seat 74 to remain closed until acted upon by fuel at a pressure above a threshold pressure. Then, the valve element 72 is displaced from the valve seat 74 and fuel flows through the valve seat. This fuel is returned to the interior volume 16 of the module 10 and is not discharged from the fuel outlet 46 of the module, and the fuel pressure discharged from the module is thus maintained at or below the threshold pressure.

Figure 3:
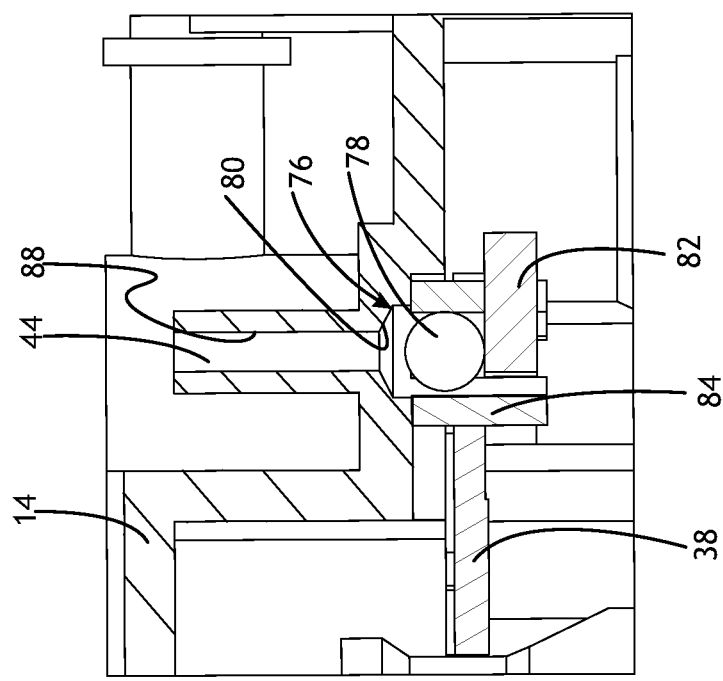
FIG. 3 is a fragmentary sectional view showing a vent valve, fuel pressure regulator bracket and cover of the fuel vapor separator.
Figure 4:
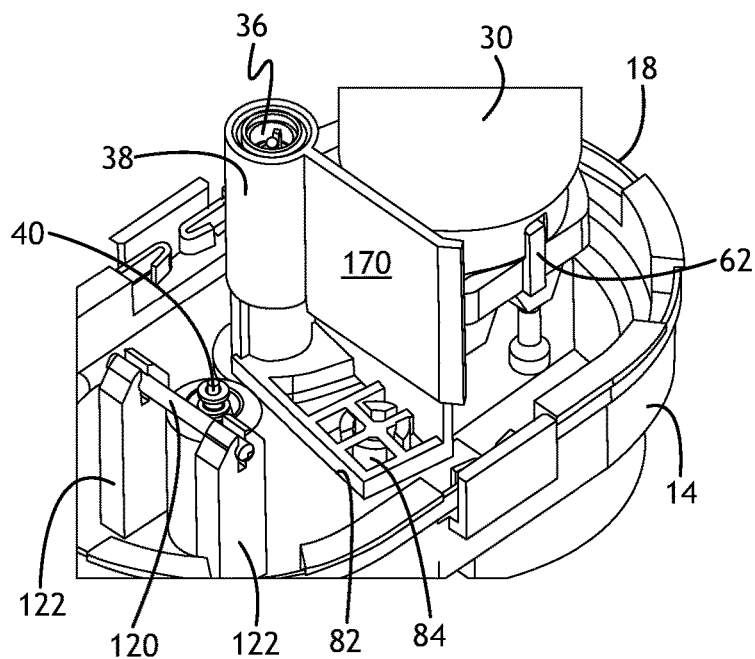
FIG. 4 is a fragmentary perspective view of a portion of the fuel vapor separator showing an inside of the cover, the fuel pressure regulator bracket and a portion of a fuel pump.

FIGS. 3 and 4 show a vapor vent valve 76 that is carried between the cover 14 and the bracket 38. The vent valve 76 may include or be defined by a ball 78 that engages a seat 80 when acted upon by liquid fuel (e.g. the ball 78 is buoyant) to selectively close the vapor outlet 44 when fuel is present at the ball, to inhibit or prevent fuel from leaking out of the vapor outlet. By simply trapping the ball 78 between the bracket 38 and the cover 14, separate retaining structures are not needed and the assembly of the module 10 is simpler and less expensive. Instead of being buoyant, the ball 78 may sink in liquid fuel and be used to close the vent 44 when the module 10 is inclined beyond a limit or inverted. This inhibits or prevents fuel from leaking from the module 10 when the module is tipped significantly or inverted. In the example shown, the bracket 38 includes a valve retaining body 82 that is spaced from the fuel pump receiving portion 60 and cavity 70 in which the fuel pressure regulator 36 is retained. The valve retaining body 82 may include snap-fit or other connection features adapted to mate with or overlie the corresponding valve receiving portion 84 of the cover 14, which is shown as a generally cylindrical cavity or bore in the cover. To simplify construction and assembly of the components, the valve retaining body 82 may be integral with the remainder of the bracket 38, that is, formed in the same piece of material and at the same time as the remainder of the bracket. The cover 14 may include a counterbore that defines the valve seat 80 and the vent passage 44 may be defined downstream of the valve seat by a smaller diameter bore 88 extending through the cover 14. The ball 78 may be larger than the bore 88 and, when engaged with the valve seat 80, prevent or significantly inhibit fluid flow through the valve seat to the bore 88. Of course, other valve types may be used and need not be retained by the bracket, as desired.

FIGS. 4 and 15-17 illustrate the inlet valve 40 for the separator module 10. The inlet valve 40 permits fluid flow at the inlet 42 to enter the interior volume 16 when the valve is open. The valve 40 is coupled to and driven by an actuator. In the example shown, the actuator is a float 90 that is buoyant in liquid. The float 90 may be or include one or more bodies that are buoyant in the liquid within the separator. If more than one body is used, the bodies may be coupled together by any suitable coupler to effectively act as a single actuator, in at least some implementations. In the example shown and to simplify further description, a single body float 90 will primarily be described hereafter. In at least some implementations, the float 90 is formed of a polymeric material and may, for example, be a foamed polymer or hollow to provide internal air pockets or chambers. In at least some implementations, the float 90 may be formed of a foamed nitrile material, such as Nitrophyl®, suitable for use in liquid fuel in a combustion engine fuel system. Of course, the float 90 may be made from a wide range of other materials suitable for an intended use. The float 90 may be made by any suitable process, including various molding processes.

Figure 12:
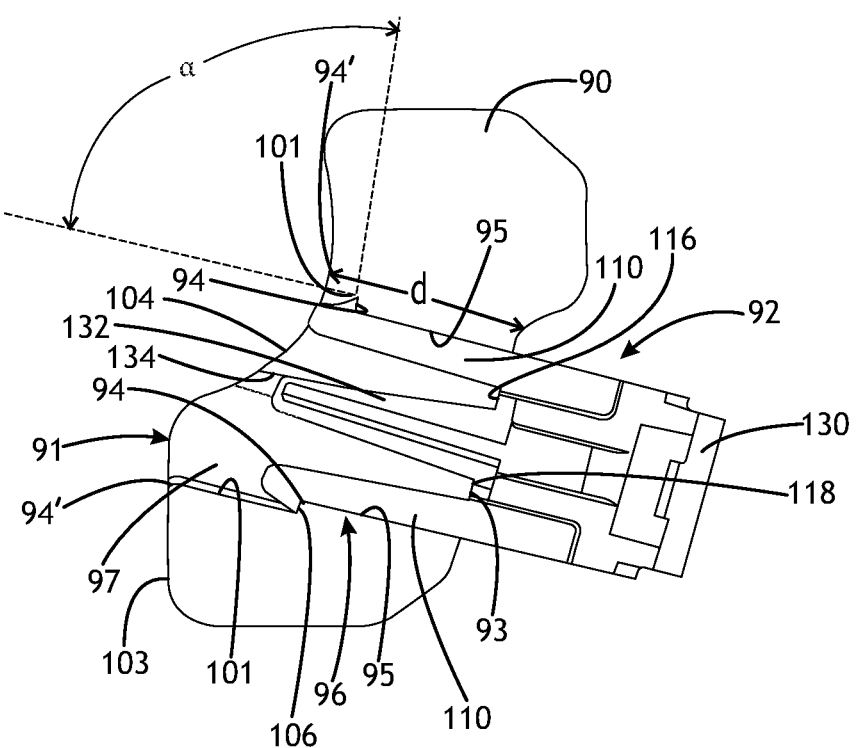
FIG. 12 is a sectional view showing the hinge assembled to the float.
Figure 13:
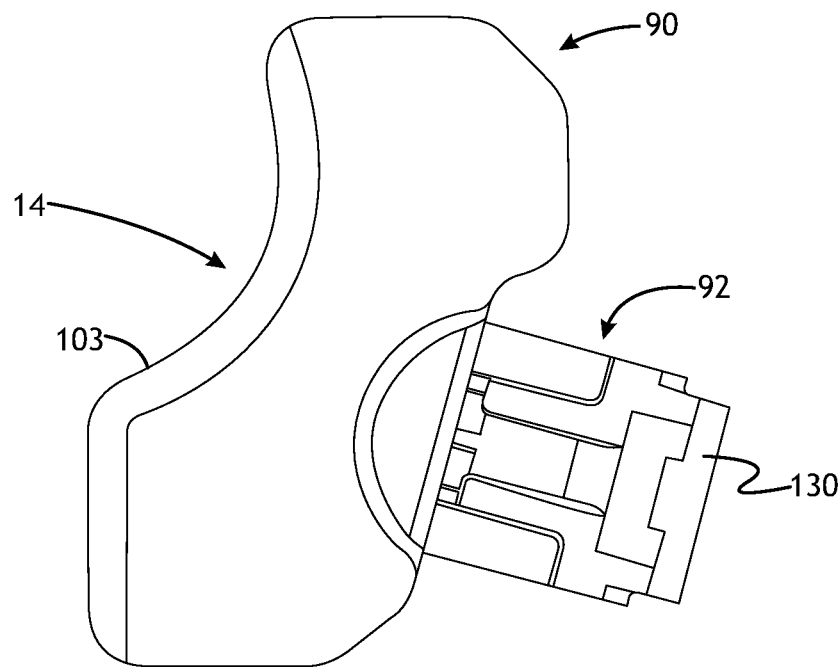
FIG. 13 is a bottom view of the float and hinge.
Figure 14:
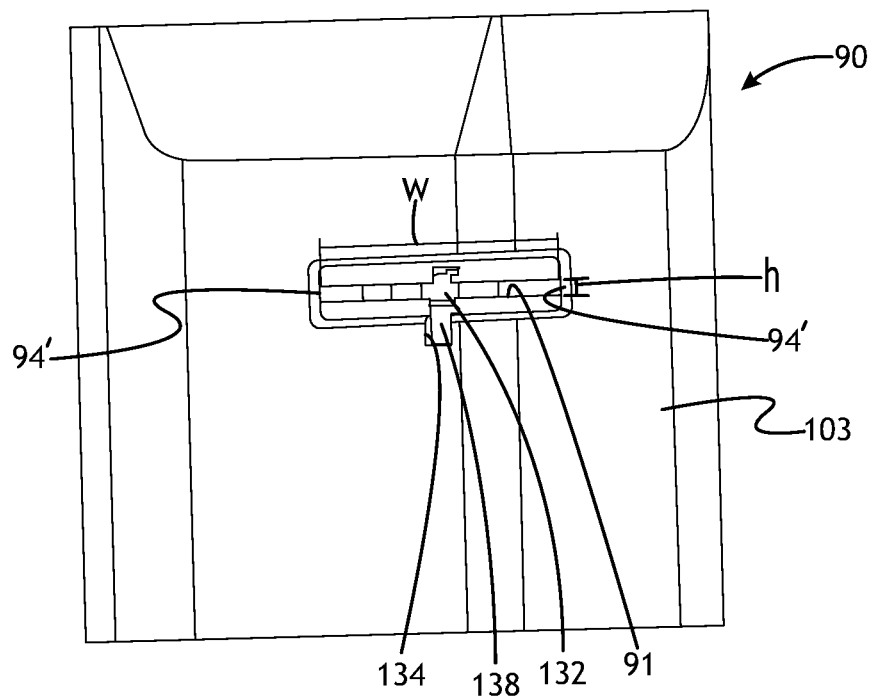
FIG. 14 is a side view of the float and hinge taken in the direction of the arrow 14 in FIG. 13.

In at least some implementations, the float 90 includes one or more connection features arranged for cooperation with corresponding connection features of a hinge 92 that couples the float 90 to the vapor separator, and to the inlet valve 40 as set forth in more detail below. As shown in FIGS. 12, 14 and 16, in at least some implementations, the float 90 includes a void 91 into which a portion of the hinge 92 may be inserted. The void 91 includes an inlet 93 through which a portion of the hinge 92 is initially inserted, and one or more retention surfaces 94 are provided within or adjacent to the void. The hinge 92 is inserted into the inlet 93 in a first direction, and the retention surfaces 94 are arranged at a non-zero angle to the first direction. That is, the retention surfaces 94 are not parallel to the direction of insertion of the hinge 92 into the float 90. In at least some implementations, the retention surfaces 94 are perpendicular to the first direction, or at an angle α relative to the insertion direction of between 20 and 130 degrees. The void 91 may be formed in the float 90 when the float 90 is formed (e.g. molded) or the void may be cut or machined into the float 90 after the float 90 is formed.

In the example shown in FIGS. 9-16, the void 91 extends through the float 90 and is defined by internal walls 95 of the float 90, which may be solid to prevent fluid from entering an interior of the float 90. In at least some implementations, the void 91 includes at least a first portion 96 that is smaller in at least one dimension measured perpendicular to the first direction, and the void includes or leads to a second portion 97 that is larger in that dimension than the first portion 96. One or more retention surfaces 94 may be defined at the transition from the first portion 96 to the second portion 97. In the example shown in FIGS. 12 and 14, the void 91 has a depth (d—labeled in FIG. 12) in the first direction, a height (h) perpendicular to the depth and a width (w) perpendicular to the height and depth. In this example, the width of the second portion 97 is greater than the width of the first portion 96, and two retention surfaces 94 are provided on opposite sides of the void 91. The retention surfaces 94 extend outwardly from opposed surfaces 95, that define the width of at least part of the first portion 96 which are spaced apart by a first distance, to surfaces 101 of the second portion 97 which are spaced apart by a second distance that is greater than the first distance. While shown as having a wider second portion 97, instead or in addition to a wider second portion, the height of the second portion could be greater than the height of the first portion 96.

While shown with retention surfaces 94 arranged within the interior of the float 90 (i.e. within the depth of the void 91, the retention surfaces could be defined by an exterior surface 103 of the float 90. In such an example, the void 91 would extend through float 90 and have an outlet 104 open to a different side of the float 90 than the inlet 93. Further, the second portion 97 of the void 91 would include the outlet 104 and the retention surfaces 94 would be defined by one or more surfaces that define and extend away from the outlet 104. Examples of such surfaces are labeled 94' in FIGS. 12 and 14.

In at least some implementations, the hinge 92 may be coupled to the float 90 without the use of a fastener, such as by a press-fit or interference fit wherein retention surfaces 106 (FIG. 11) of the hinge 92 overlie or overlap the retention surfaces 94 of the float 90 in the installed position of the hinge 92 and resist removal of the hinge 92 from the float 90. In this regard, the hinge 92 may have one or more retention portions 108 in which one or more retention surfaces 106 are defined, and the retention portion may be flexible and resilient. Upon insertion of the hinge 92 into the void 91, the retention portion(s) 108 flexes inwardly for receipt in and through the smaller first portion 96 of the void 91 and then when received in the larger second portion 97 of the void, the retention portion 108 resiliently returns to or toward its unflexed state which positions the hinge 92 retention surfaces 106 overlapped with the float retention surfaces 94 in a direction that opposes removal of the hinge 92 from the void 91 in a second direction, opposite to the first direction. In the example shown, the hinge 92 includes one or more flexible fingers 110 (shown as two fingers) that include outwardly extending retention surfaces 106 (i.e. extend away from a centerline 112 (FIG. 11) of the hinge 92 drawn in the first direction). The fingers 110 may be defined in part by slots 114 formed in the hinge 92 between the fingers 110 and the centerline 112 to permit the fingers to flex inwardly, toward the centerline, when the fingers 110 pass through the smaller first portion 96 of the void. The hinge 92 may also include a limit surface 116 adapted to engage a stop surface 118 of the float 90 to limit insertion of the hinge 92 into the void 91. The limit surface 116 may be arranged at a distance from the hinge retention surfaces 106 that is about equal to the distance between the float retention surfaces 94 and stop surface 118 so that the hinge 92 is snugly coupled to the float 90 with limited or no relative movement permitted between them in the first or second directions, in assembly. Of course, other arrangements may be provided including those enabling or permitting some relative movement.

The float 90, the hinge 92, or both are coupled to the valve 40 to move the valve as the float 90 moves in response to a change in liquid level in the module 10. In at least some implementations, such as is shown in FIGS. 4, 9, 15 and 16, the inlet valve 40 is connected to the hinge 92, and the hinge 92 is coupled to the float 90 and to a pivot 120 about which the float 90 pivots. The hinge 92 may be carried by the cover 14, such as by one or more than one depending support 122 extending from an interior surface 124 of the cover 14 toward a bottom wall 125 (FIGS. 1 and 2) of the separator body 12 such that the pivot point for the hinge 92 and/or float 90 is spaced from the interior surface 124 of the cover 14. In the example shown, the pivot is defined by a pin 120 that is coupled to two supports 122 that are spaced apart and the hinge 92 is coupled to the pivot pin 120 in the space between the two supports. The pin 120 may be slid through aligned openings in the supports 122 or snap-fit into slots formed in the supports 122, by way of two, non-limiting examples of possible connections between the pin and supports. A fastener, such as a clip or cover plate may also be used to retain the pin 120 to the supports 122, if desired.

In more detail, the hinge 92 may include a pivot retaining feature 126 arranged to receive at least part of the pin 120 and to couple the hinge 92 to the pin. The pivot retaining feature may be one or more openings 126, a passage or other structure that couples the hinge 92 to the pin 120. In the example shown, the hinge 92 includes aligned openings 126 in spaced apart flanges, with the openings 126 arranged so that the pin 120 can be slid first through one opening and then through the other, with opposed ends of the pin 120 protruding from opposed sides of the hinge 92. The ends of the pin 120 are then pressed into slots formed in free ends of the supports 122. Of course, other arrangements are possible. The pin 120 may be generally cylindrical and the pivot retaining feature 126 may be generally complementarily shaped. In use, as the float 90 moves, the hinge 92 may rotate relative to the pin 120, or the hinge 92 and pin 120 may rotate together and relative to the supports 122. To limit the extent to which the inlet valve 40 may move away from a valve seat 128 (FIG. 16), the hinge 92 may include a pivot stop 130 arranged to engage one or both supports 122, or some other structure, to define the full open position of the inlet valve 40. For example, when the valve 40 is received within a passage, it may be desirable to limit valve movement to prevent the inlet valve 40 from being pulled out of the passage. The pivot stop 130 may be defined by a portion of the hinge 92 on the opposite side of the pivot pin 120 than the hinge 92 retention features. Hence, as the float 90 moves lower to open the valve 40, the pivot stop 130 is raised and eventually engages some structure to limit float 90 and inlet valve 40 movement.

To provide additional stability for the hinge 92, if desired, the float 90 and hinge 92 may include cooperating or complementary control features. In at least some implementations, the control features include one or more voids and one or more projections received within the one or more voids to reduce, inhibit or prevent relative motion between the float 90 and at least part of the hinge 92 in at least one direction. In the example of the hinge 92 shown in the figures, and with particular reference to FIG. 12, the flexible fingers 110 are separated from a central portion 132 of the hinge 92 by the slots 114, which permit flexing of the fingers 110 relative to the central portion 132 as noted above. While permitting insertion of the hinge 92 into a smaller portion of the void 91, the slots 114 and flexible fingers 110 may also permit movement of the float 90 and some skewing or twisting or compression of the hinge 92 in the direction that the fingers flex in assembly. To reduce or prevent such motion, the control features are overlapped in assembly in a direction that opposes such motion.

In more detail, in the example shown and referring to FIGS. 12 and 14, the float 90 includes a channel 134 defined by sidewalls having a length in the first direction and a height perpendicular to the first direction along at least a portion of the void 91 in which the hinge 92 is received. The central portion 132 of the hinge 92 includes a complementary projection, shown as an elongated flange 138 (FIGS. 11 and 14) extending in the first direction, that is received within the channel 134 when the hinge 92 is assembled into the float 90. When the hinge 92 is assembled to the float 90, the central portion 132 of the hinge 92 does not move relative to the float 90 in the direction that the fingers 110 flex, such movement being resisted by engagement of the flange 138 with the opposed sidewalls of the channel 134. The channel 134 and flange 138 may also help locate and guide the hinge 92 relative to the float 90 as the hinge is slidably inserted into the void 91 which may prevent the hinge 92 from becoming skewed in the void which could lead to improper assembly (e.g the retention surface 106 of only one finger 110 becoming engaged with a float 90 retention surface 94). So arranged, only the fingers 110 flex laterally and lateral movement of the remainder of the hinge 92 is inhibited or prevented providing a more stable connection between the hinge 92 and float 90. While the implementation shown and described has the hinge 92 with the projection and the float 90 with the void, the arrangement could be reversed, or more than one control feature may be provided and the float 90 and hinge 92 may have any desired combination of voids and projections. When the height of at least part of the void 91 is closely matched to the height of corresponding portions of the hinge 92, relative movement between the float 90 and hinge 92 can be opposed in both directions that are perpendicular to the first direction to provide further stability to the assembly.

The hinge 92 may be formed from any suitable material such as various plastics or metals. If desired, the hinge 92 may be molded from a plastic material and formed separately from the float 90. Then, the material of the hinge 92 need not be subjected to the heat required to mold the float 90, which is one reason why previous float hinges were formed from metal which could be insert molded to the float 90. Metal hinges can be more expensive than plastic hinges, and insert molding the float to the hinge can be a more difficult and expensive process than forming the float 90 separately from the hinge 92. Further, forming the float 90 separately from the hinge 92 and coupling the hinge 92 to the float 90 after both components have been formed can also simplify inlet valve assembly. As noted in more detail below, the inlet valve 40 can be easily coupled to the hinge 92 and then the inlet valve 40 can be trapped between the float 90 and hinge 92 when the hinge 92 is assembled to the float 90 to prevent the inlet valve from becoming disconnected from the hinge 92. This is not possible or cannot be done easily if the hinge 92 is molded into the float 90. Further, in at least some implementations, the assembly of the hinge 92, float 90 and inlet valve 40 can be done without any fasteners, adhesives, bonding or welding.

One benefit, in at least some implementations, of having the hinge molded separately from the float is that a common hinge design may be used with multiple different float designs. Hence, where a different float size or shape is needed, the float can be readily designed to incorporate a hinge as used in other floats. In at least some implementations, the float and hinge are made from materials that may be used in gasoline, ethanol and with other fuels and fuel additives, some example materials include: POM, PA, PPA, PEEK and PET. The hinge could also be stamped from a metal, like stainless steel or brass. In examples where the float is formed from NBR, the molding process for the float may be carried out at a relatively high temperature, such as about 185° C. While the hinge could be separately molded and then placed as an insert in a mold used to form the float, many materials that can survive the high temperature of the float molding process may be more expensive. So forming the hinge separately and inserting the hinge into the float after the float is formed, can result in a lower cost product and also a more robust design as the hinge is not subjected to the high heat. Further, as noted above and below, the hinge may integrally includes, in a single piece of material, many features that provide different functionalities. Such features may be difficult, costly or impossible to form in a stamped metal hinge. The plastic material of the hinge may also be lighter and so a smaller float can be used, or a less buoyant float, as less buoyancy force is needed to offset the mass of a lighter hinge.

Figure 18:
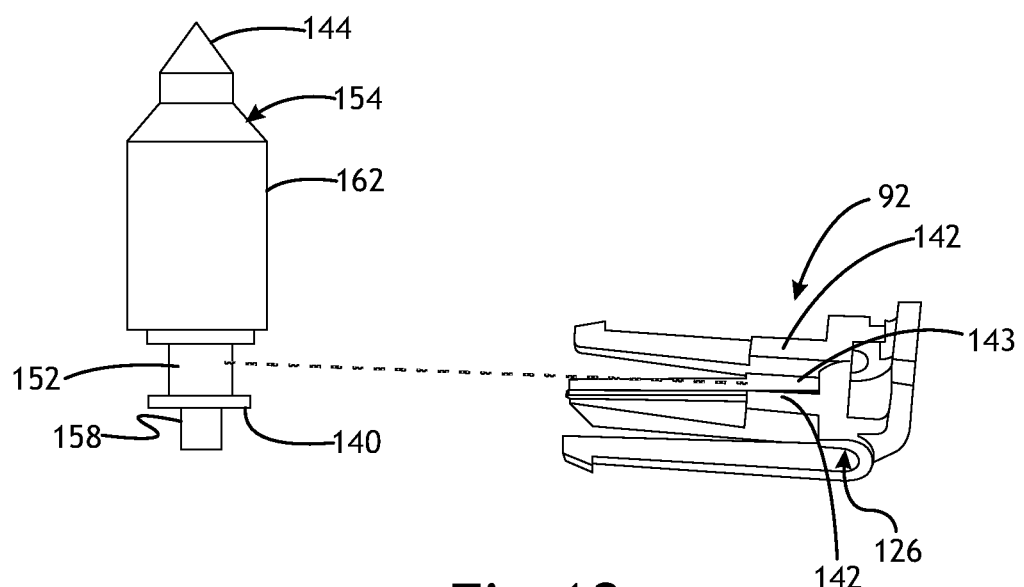
FIG. 18 is an exploded view showing the inlet valve and hinge.

In at least some implementations, the inlet valve 40 is coupled to the hinge 92 at a location spaced from the pivot pin 120, and between the pivot pin 120 and the location at which the hinge 92 is coupled to the float 90. As noted above, the inlet valve 40 could instead be coupled to both the float 90 and hinge 92, or to only the float 90, or to another component that moves when the float 90 moves or is otherwise responsive to float 90 movement, as desired. The inlet valve 40 may include a flange 140 or other coupling feature arranged to facilitate coupling the valve to the hinge 92. The hinge 92, in turn, includes one or more coupling features such as flanges or tabs 142 that overlie the coupling feature of the inlet valve 40 to retain the inlet valve on the hinge 92. As shown in FIGS. 15, 16 and 18, the inlet valve 40 may be inserted into a groove or slot 143 defined at least in part by the tabs 142 so that the tabs 142 overlie the valve flange 140, and then the hinge 92 may be coupled to the float 90. When the hinge 92 is installed on the float 90, the float 90 closes an end of the slot 143 to prevent removal of the inlet valve 40 from the hinge 92.

Spaced from the portion coupled to the hinge 92, the inlet valve 40 includes a head 144 at an end of the inlet valve that is arranged to selectively engage the valve seat 128 to close the module inlet 42 and prevent fuel flow into the module 10. As shown in FIGS. 15 and 16, the valve seat 128 may be defined in an insert 146 or other component carried by the module cover 14 and having a passage 148 aligned with the inlet 42, or the valve seat 128 may be a surface of the cover 14 surrounding the module inlet 42. The inlet valve 40 may extend into a portion of the inlet passage 42 or insert passage 148 and may reciprocate relative to the valve seat 128 between open and closed positions. In the example shown, the valve seat 128 is defined in the insert 146 which is pressed into the inlet passage 42 and the inlet valve 40 reciprocates within the passage 148 of the insert.

In at least some implementations, the inlet valve 40 is yieldably biased, such as by a spring 150, so that at least a portion of the inlet valve moves relative to the hinge 92 and float 90. This may reduce unintended opening of the inlet valve 40 due to small movements of the float 90, such as may be caused by movement/sloshing of the fuel in the module 10. Such unintended opening of the inlet valve 40 may otherwise permit too much fuel to enter the module 10.

In at least some implementations, the inlet valve 40 includes a body having a first portion 152 that includes the flange 140 and a second portion 154 that includes the head 144 which may move relative to the first portion 152. In at least some implementations, the spring 150 is received within the second portion 154 and is trapped between the first portion 152 and second portion, or between the first portion and a stem 158 that extends through an opening in the first portion 152, as shown in the illustrated example in FIGS. 16 and 17. The spring 150 may permit relative movement between the stem 158 and the rest of the valve. The exterior 162 of the second portion 154 may be fluted or include fluid flow features that enable fuel flow between the exterior 162 of the second portion and the valve seat insert 146 or fuel inlet 42 when the valve head 144 is not closed on the valve seat 128.

When the level of liquid fuel in the separator 10 is below a threshold, the float 90 is lowered to a point at which the inlet valve 40 is opened, that is, the head 144 is removed from the valve seat 128. When the float 90 is raised above that point by liquid fuel acting on the float 90, the inlet valve 40 is closed, that is, the head 144 is engaged with the valve seat 128, and fluid flow through the separator inlet 42 is inhibited or prevented. Small movements of the float 90 when the volume of fuel in the separator is such that the inlet valve 40 should be closed, may be accommodated by movement of the hinge 92 the spring 150 and stem 158 which put apply between the flange 140 and tabs 142 to prevent the head 144 from bouncing against the valve seat 128.

Figure 6:
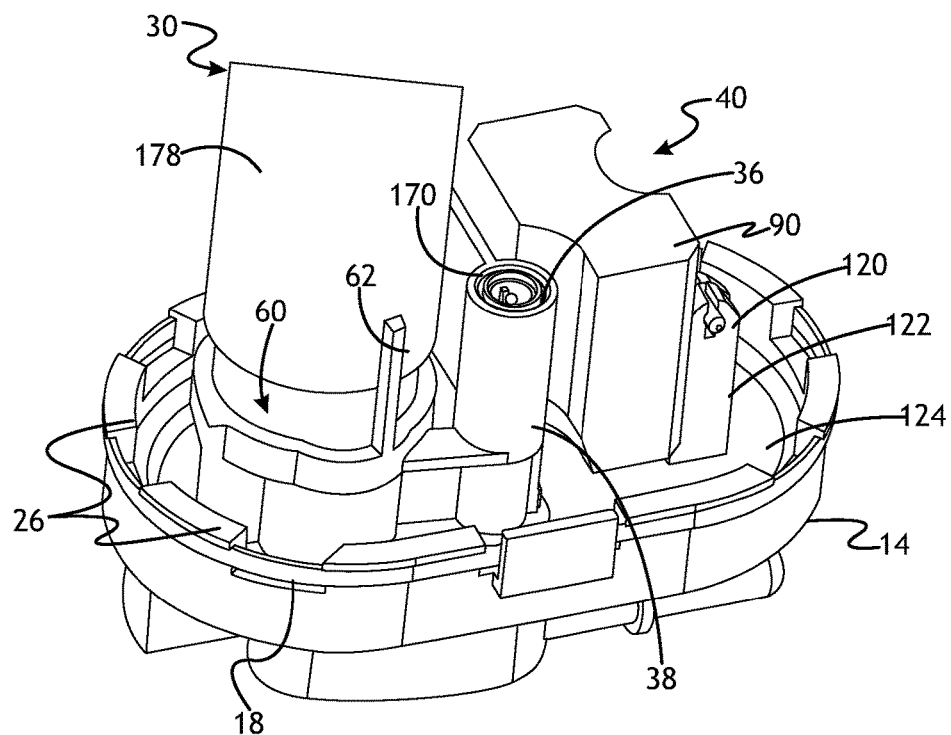
FIG. 6 is a perspective view of the bracket, fuel pump, float and cover.
Figure 8:
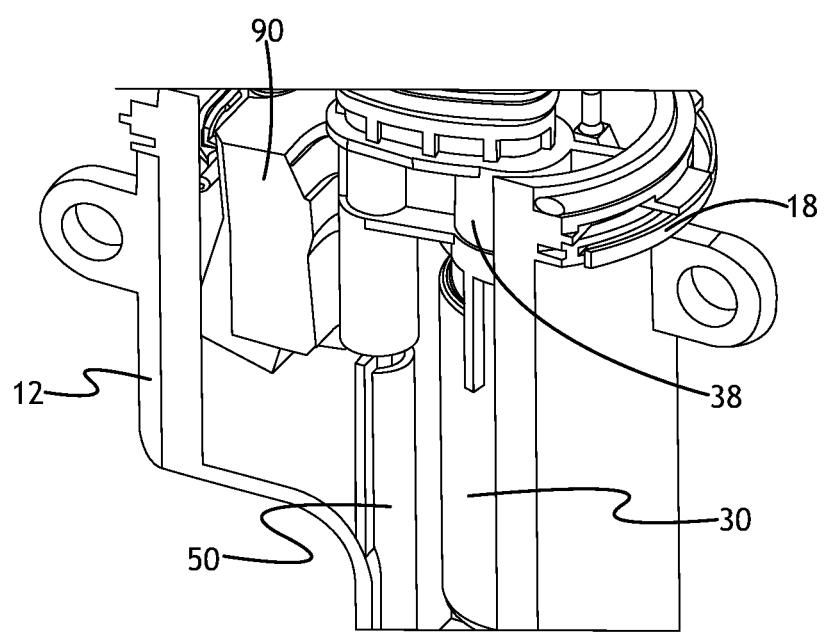
FIG. 8 is a perspective fragmentary sectional view of the body of the separator and the bracket and float.
Figure 9:
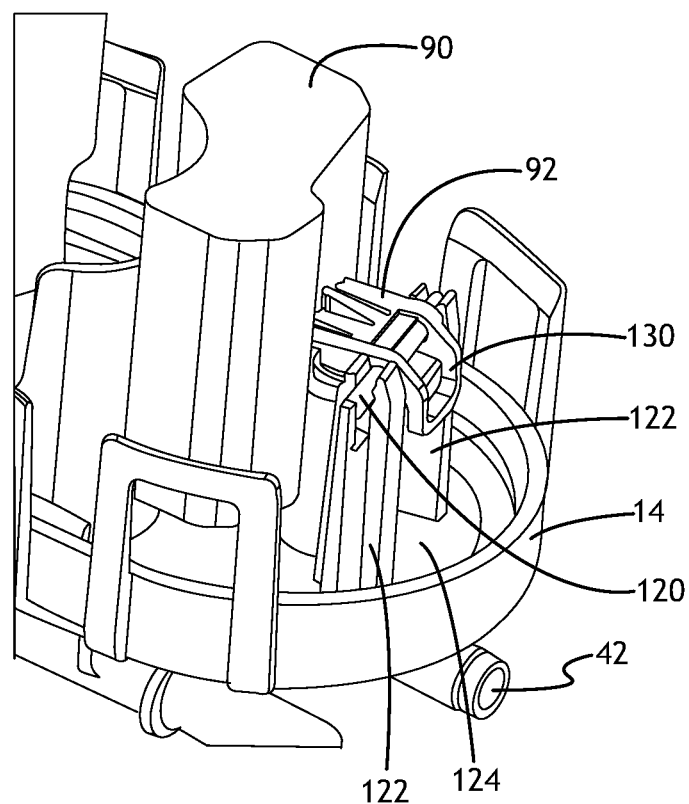
FIG. 9 is a perspective view of the bottom of a slightly modified cover (having different features to retain the cover and body together) and float valve.
Figure 10:
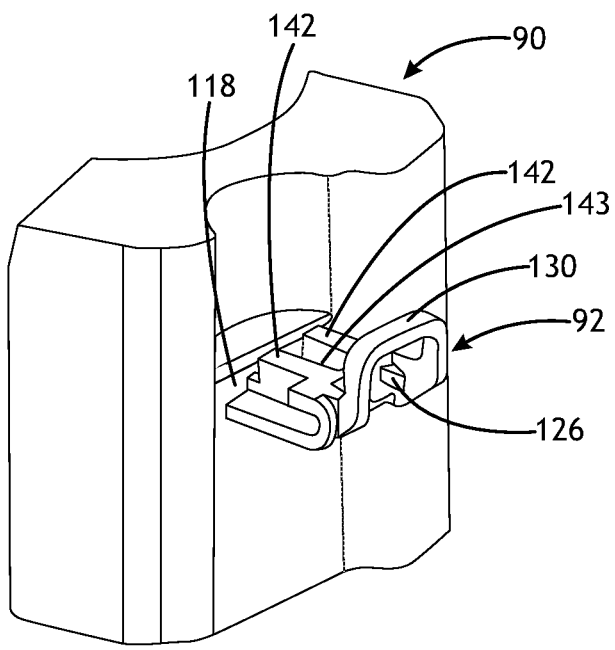
FIG. 10 is a perspective view of the float and a hinge coupled to the float.
Figure 11:
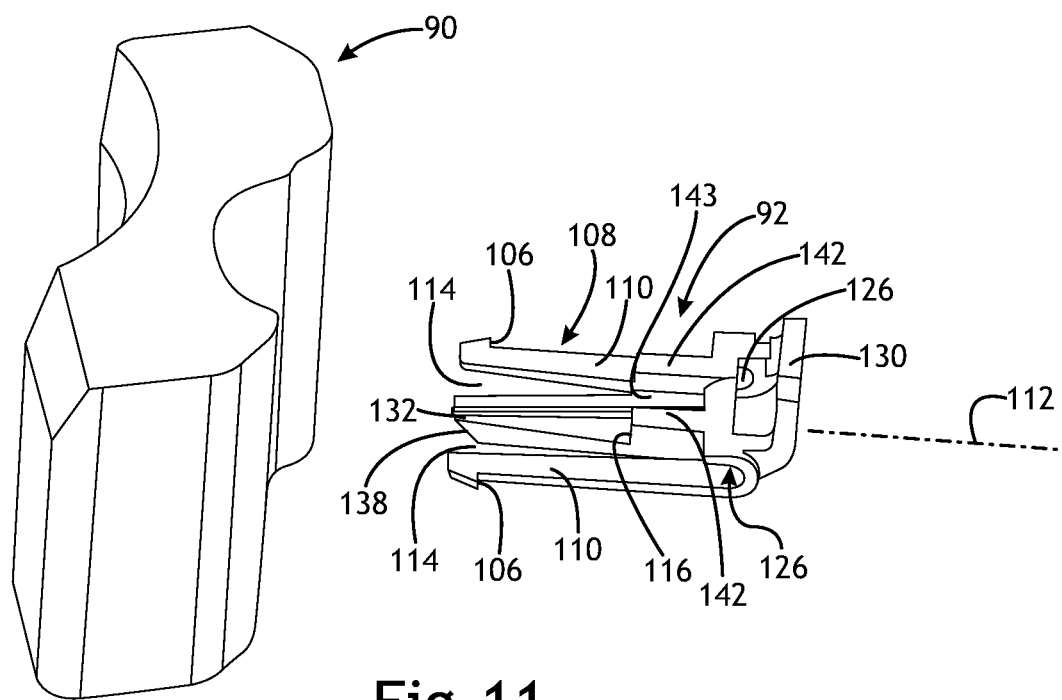
FIG. 11 is a perspective exploded view of the float and hinge.

A wall 170 (FIG. 7) of the bracket 38 keeps the float 90 separate from the fuel pump 30, the pump filter 32 and electric wires 171 that are routed to the fuel pump, as shown in FIGS. 6 and 15. The wall 170 inhibits or prevents such components from interfering with the movement of the float 90 in response to changing liquid level in the interior volume 16. The wall 170 may extend along any axial length of the fuel pump 30 (relative to a longitudinal axis 172 (FIG. 5) of the fuel pump), or longitudinal height of the separator 10, and have a desired width transverse to the axial or longitudinal length to provide a barrier of a desired size between the portion of the separator in which the fuel pump 30 is received and the portion in which the float 90 is received. So as to not take up unnecessary volume in the separator, the wall 170 may be made relatively thin, such as between about 2 and 10 mm. To reduce vapor generation, the wall 170 may also reduce liquid fuel slosh in the separator interior volume 16 by providing a barrier that interrupts liquid movement in the separator. The wall, when part of the bracket 38, like the pump receiving portion 60 and valve retaining body 82 may be formed in one piece and at the same time as the remainder of the bracket such that the bracket is an integral, one-piece body that has portions serving the different functions and structural relationships discussed above. A wall to separate the other components from the area of the float 90, and/or to reduce fuel slosh may also or instead be provided as part of the cover 14 or the body 12, such as the web 50 noted above. As shown in FIGS. 8 and 15, the wall and/or web 50 may be generally parallel to the pump axis 172, and extend laterally between opposed sidewalls 174, 176 (FIG. 2) or sidewall portions of the separator body 12. In other words, the wall 50 may be formed at the same time and from the same piece of material as the remainder of the separator body 12 or the wall may be an insert assembled into and carried by the separator body.

FIG. 6 also shows that the bracket 38 may engage a metal outer shell or casing 178 of the fuel pump 30. When the bracket 38 itself is formed of an electrically conductive material (e.g. metal or a conductive plastic, such as but not limited to plastics that are doped with or otherwise include carbon or metallic particles), the fuel pressure regulator 36 and the vent valve 76 may be electrically grounded through the bracket 38 and the fuel pump casing 178 as the fuel pump 30 is itself grounded in known manner.

While the forms of the invention herein disclosed constitute presently preferred embodiments, many others are possible. For example, the inlet valve 40 including the float 90 and hinge 92 as described herein can be used in a wide range of products and are not limited in any way to use with a liquid and vapor separator, which is just one possible application. For example, without intending to limit the disclosure to just the described examples, the float 90 and hinge 92 may be used in a float bowl carburetor wherein the float is received within a fuel bowl of the carburetor. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An assembly, comprising:
a float having a void with an inlet leading into the void in a first direction, and at least one retention surface that is not parallel to the first direction;
a hinge received at least partially within the void and having at least one retention feature that engages the at least one retention surface of the float to inhibit removal of the hinge from the float in a second direction opposite to the first direction, wherein the hinge is formed from a polymeric material, and wherein the hinge has a dimension greater than a dimension of a corresponding portion of the void, and the hinge has a finger that flexes to reduce the dimension of the hinge so that the hinge including the finger may be received in the void, and wherein the hinge includes one or more openings or a passage formed in a portion of the hinge outboard of the float; and
a pin received in said one or more openings or passage of the hinge, and the pin defining a pivot about which the float pivots.

2. The assembly of claim 1 wherein the polymeric material that the hinge is formed from has a melting point similar to or lower than the melting point of a material that the float is formed from.

3. The assembly of claim 1 wherein the void has a first portion and a second portion, and the first portion is smaller than the second portion, and wherein the finger is resilient and the at least one retention feature is carried by the finger, and when the hinge is inserted into the void the finger flexes from an original position to reduce the dimension of the hinge, and when the at least one retention feature is received in the second portion of the void, the finger unflexes to increase the dimension of the hinge.

4. The assembly of claim 1 wherein the at least one retention feature is carried by the finger.

5. The assembly of claim 1 wherein the float and hinge include complementary control features that engage each other to inhibit movement of the hinge in a direction perpendicular to the first direction.

6. The assembly of claim 1 wherein the hinge includes a limit surface adapted to engage a stop surface of the float to limit insertion of the hinge into the void.

7. The assembly of claim 6 wherein the at least one retention feature of the hinge is defined by a retention surface and the limit surface is arranged at a distance from the at least one retention surface of the hinge that is equal to or greater than a distance between the at least one retention surface of the float and the stop surface.

8. An assembly, comprising:
a float having a void with an inlet leading into the void in a first direction, and at least one retention surface that is not parallel to the first direction;
a hinge received at least partially within the void and having at least one retention feature that engages the at least one retention surface of the float to inhibit removal of the hinge from the float in a second direction opposite to the first direction, wherein the hinge is formed from a polymeric material, and wherein the hinge has a dimension greater than a dimension of a corresponding portion of the void, and the hinge has a finger that flexes to reduce the dimension of the hinge so that the hinge may be received in the void; and
a valve body trapped between the float and hinge without a fastener, adhesive, bond or weld between the valve body and hinge, and wherein the valve body includes a flange that is received in a void of the hinge, and wherein the float prevents removal of the flange from the void of the hinge.

9. The assembly of claim 8 wherein the hinge includes a pivot coupling feature spaced from the valve body.

10. A liquid vapor separator, comprising:
a body defining at least part of an interior volume;
a float received within the interior volume, the float being buoyant in liquid that may be received in the interior volume, and the float having a void with an inlet leading into the void in a first direction, and at least one retention surface that is not parallel to the first direction;
a hinge received at least partially within the void and having at least one retention feature that overlaps the at least one retention feature of the float to inhibit removal of the hinge from the float in a second direction opposite to the first direction, wherein the hinge is formed from a polymeric material and the hinge has a dimension greater than a dimension of a corresponding portion of the void, and the hinge has a finger that flexes to reduce the dimension of the hinge so that the hinge including the finger may be received in the void and the at least one retention feature is carried by the finger; and
a valve body having a coupling feature that is overlied by a coupling feature of the hinge, and wherein the valve body is trapped between the hinge and float so that removal of the valve body from the hinge is prevented by engagement of the valve body with the float.

11. The liquid vapor separator of claim 10 wherein the polymeric material of the hinge has a melting point similar to or lower than the melting point of a material of the float.

12. The liquid vapor separator of claim 10 wherein a portion of the finger including the retention feature extends through the void of the float, and the finger is resilient to increase the dimension of the hinge so that the retention feature overlaps a surface of the float.

13. The liquid vapor separator of claim 10 wherein the valve body is trapped between the float and hinge without a fastener, adhesive, bond or weld between the valve body and hinge.

14. The liquid vapor separator of claim 10 wherein the valve body includes a flange that is received in a void of the hinge, and wherein the float prevents removal of the flange from the void of the hinge.

15. The liquid vapor separator of claim 10 which also includes a pivot and wherein the hinge includes a pivot coupling feature spaced from the valve body and coupled to the pivot to permit pivoted movement of the float within the interior volume.

16. The liquid vapor separator of claim 15 wherein the valve body is moved as the float moves about the pivot.

17. The liquid vapor separator of claim 16 which also includes a spring that yieldably biases the valve body relative to the hinge and float so that at least a portion of the valve body moves relative to the hinge.

18. The liquid vapor separator of claim 10 which also includes a cover that, with the body, defines the interior volume, and wherein the cover includes a pivot to which the hinge is coupled for pivoted movement of the hinge and float relative to the cover.

19. The liquid vapor separator of claim 18 wherein the valve body is coupled to the hinge at a location spaced from the pivot, and wherein the cover includes an inlet through which liquid enters the interior volume, and the valve body is moved relative to the cover, as the float moves relative to the cover, to selectively open and close the inlet of the cover.

* * * * *